US 6,571,928 B1

(12) United States Patent
Gassmann (10) Patent No.: US 6,571,928 B1
(45) Date of Patent: Jun. 3, 2003

(54) ENGAGEMENT MECHANISM WITH TWO STAGE RAMP ANGLE

(75) Inventor: Theodor Gassmann, Siegburg (DE)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 10/036,616

(22) Filed: Dec. 21, 2001

(51) Int. Cl.[7] ............................................... F16D 13/38
(52) U.S. Cl. .................... 192/93 A; 192/70.23; 192/35; 192/84.6
(58) Field of Search ............................... 192/84.7, 84.6, 192/35, 54.52, 70.23, 93 A (56) References Cited

U.S. PATENT DOCUMENTS

| 3,118,292 A | * | 1/1964 | Schroter et al. | ............... 464/36 |
| 3,952,843 A | * | 4/1976 | Campbell et al. | ......... 192/93 A |
| 4,550,817 A | * | 11/1985 | Euler | ...................... 192/70.23 |
| 5,106,349 A | * | 4/1992 | Botterill et al. | ........... 192/93 A |
| 5,819,883 A | * | 10/1998 | Organek et al. | ......... 192/70.23 |
| 6,082,504 A | * | 7/2000 | Organek et al. | ............... 192/35 |
| 6,460,677 B1 | * | 10/2002 | Roscoe | ...................... 192/84.7 |

* cited by examiner

Primary Examiner—Rodney H. Bonck
Assistant Examiner—Eric M Williams
(74) Attorney, Agent, or Firm—Mick A. Nylander

(57) ABSTRACT

An engagement mechanism for use in a vehicle includes a housing. The engagement mechanism also includes a first ball ramp disc engaging the housing on one side. The first ball ramp disc includes a first ramp on the side engaging the housing. The first ball ramp disc also includes a second ramp having a predetermined angle on the side opposite of the side engaging the housing. The engagement mechanism further includes a ball ramp disc adjacent to the first ball ramp disc on a side opposite of the side engaging the housing which is rotatably driven. The engagement mechanism also includes a spring element arranged between the first ball ramp disc and the second ball ramp disc. The engagement mechanism is used to engage a friction clutch pack of a vehicle drivetrain system.

19 Claims, 4 Drawing Sheets

*Prior Art*

FIG. 2.

*Prior Art*

ENGAGEMENT MECHANISM WITH TWO STAGE RAMP ANGLE

BACKGROUND OF THE INVENTION

1. Field of the Invention

The present invention relates generally to engagement systems for use in an automotive vehicle, and more particularly relates to an electro mechanical engagement system for use in combination with a friction clutch to control the torque in the driveline of a vehicle.

2. Description of Related Art

Torque distribution systems in automotive vehicles have been known for many years. The torque distribution systems are used on either a front axle or a rear axle or between the axles of an automotive vehicle. Generally, the torque distribution systems deliver torque to a wheel at all times at a fixed percentage or in an on demand manner. Torque distribution systems have some type of engagement system that will engage a friction clutch which includes a plurality of plates therein. Many types such as electrical, hydraulic and mechanical or electro mechanical systems have been designed for engaging the friction clutch. One of the more popular existing designs is the use of a ball ramp mechanism to convert rotation into axial displacement. This axial displacement is created by taking the torque load from the rotation of the ball ramp mechanism and transforming that torque into an axial force which is applied to a friction clutch. These friction clutches will then distribute torque to the prop shafts or side shaft of a vehicle in a variety of manners by the torque distribution system.

There are numerous different design variations of the prior art ball ramp mechanisms. Generally, the ramp angle of the ball ramp mechanism defines the ratio of the torque vs. force conversion as well as the necessary rotation angle needed to achieve the required axial travel. In these prior art systems the required axial travel to engage the clutch pack is defined by the sum of the build tolerances, clutch pack settling and wear, and the required clutch pack clearance in its open condition. Furthermore, these prior art systems have a required number of balls within the ball ramp mechanism and a predetermined circumference of the ball circle which also defines the available rotational angle, which then in combination with any ramp angles of the ball ramp mechanism defines the available axial stroke.

However, the prior art ball ramp mechanisms do have a number of drawbacks. One such drawback is that in order to limit the required engagement torque a small ramp angle is required, however, at the same time to provide maximum engagement travel, with the maximum number of balls, a steep ramp angle is necessary. These two requirements are contrary to each other and lead to a compromised design in all of the prior art ball ramp mechanisms in terms of shimming the clutch pack to minimize the tolerances and using high engagement torques necessary for the required engagement travel. Another problem with the prior art devices is that the required axial force necessary to operate the ball ramp mechanism during engagement is not constant, it tends to be small or low while the ball ramp mechanism system removes any clearances such as tolerances, clutch pack clearance to reduce losses. The force then increases in a progressive manner when the clutch pack actually begins its engagement. A constant ramp angle would not encounter this variation of axial force during engagement. Other attempts to over come this non-constant axial force during engagement have been tried such as, a ramp with a digressive angle however, this digressive angle ramp will only work if the position of the balls is perfectly defined in relation to the engagement arrangement of the clutch. Furthermore, built in tolerances and clutch pack wear will effect the working position of the balls during engagement and therefore the function of the digressive ramp. This causes problems with engagement and the amount of time required to engage the clutch pack as necessary.

Therefore, there is a need in the art for a ball ramp mechanism that applies a constant axial force during engagement of the clutch pack while also reducing the lag time for actual clutch engagement to occur. Furthermore, there is a need in the art for a more precise control of the amount of axial load being placed against the clutch pack thus ensuring a more definitive response rate to on road vehicle conditions.

SUMMARY OF THE INVENTION

One object of the present invention is to provide an improved electro mechanical engagement system for a friction clutch.

Another object of the present invention is to provide a double stage ramp mechanism for an electro mechanical engagement system.

Yet a further object of the present invention is to provide an engagement mechanism that automatically switches from a high ramp angle to a small ramp angle during the different stages of a clutch pack engagement.

A further object of the present invention is to provide an engagement mechanism that minimizes the required angular rotation and torque necessary by maximizing the engagement force and the engagement stroke.

To achieve the fore going objects an engagement mechanism for use in a housing in an automotive vehicle is disclosed. The engagement mechanism includes a first ball ramp disc engaging the housing on one side. The engagement mechanism further includes a second ball ramp disc adjacent to the first ball ramp disc on the side opposite the housing. The engagement mechanism also includes a spring arranged between the first ball ramp disc and the second ball ramp disc. The first ramp disc includes a first ramp on the side engaging the housing and a second ramp on the side opposite of the first ramp. The second ball ramp disc includes a ramp on the side adjacent to the first ball ramp disc.

One advantage of the present invention is a new and improved electro mechanical engagement system for a friction clutch.

Another advantage of the present invention is a double stage ramp mechanism for use in a friction clutch.

A further advantage of the present invention is an engagement mechanism that has a self-adjusting mechanism.

Yet another advantage of the present invention is an engagement mechanism that provides a low angle engagement ratio at low engagement forces and a high ratio once the clutch requires high engagement forces.

Yet a further advantage of the present invention is that the engagement mechanism minimizes the required angular rotation and torque necessary by maximizing the engagement force and the engagement stroke.

Still another advantage of the present invention is that the mechanism switches automatically from a high ramp angle to a small ramp angle depending on the different stages of the clutch pack engagement.

Other objects, features and advantages of the present invention will become apparent from the subsequent

BRIEF DESCRIPTION OF THE DRAWINGS

FIG. 6 shows a partial cross section of an axle module according to the present invention.

BEST MODE OF CARRYING OUT THE INVENTION AND DESCRIPTION OF THE PREFERRED EMBODIMENT(S)

Referring to the drawings, a double stage ramp mechanism 80 for use in an electro mechanical engagement system for a friction clutch is shown. The double stage ramp mechanism 80 can be used in either a front axle or rear axle of an automotive vehicle. It may be used in any type of drivetrain system such as an all wheel drive, a front wheel drive, or a rear wheel drive.

Figure 1:
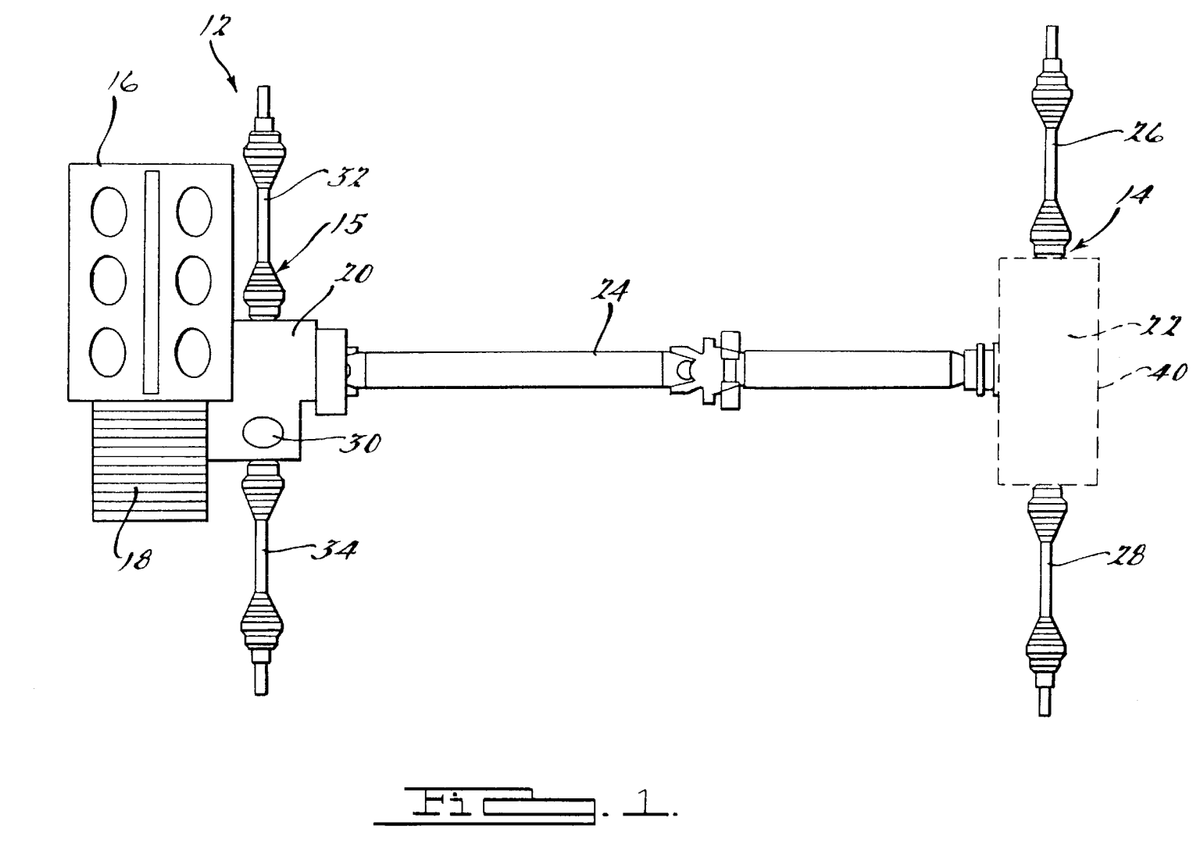
FIG. 1 shows a schematic view of a vehicle.

FIG. 1 schematically illustrates an all wheel drive or four wheel drive motor vehicle 12 that is primarily front wheel driven, however the present invention can also be used on a primary rear wheel driven vehicle. A motor vehicle 12 as shown in FIG. 1 is permanently driven by a front axle 15. The motor vehicle 12 is driven by power transferred from the engine 16 through a transaxle or gear box 18 which may be either an automatic or manual gear box. The power from the gear box 18 enters the power take off 20 of the drivetrain assembly and finally on through to the front differential 30. When there is a demand for power, it is transferred to the rear axle module 22 via a propeller shaft or driving shaft 24. At the rear axle module 22 power splits to a left hand rear side shaft 26 and a right hand rear side shaft 28 for distribution to the wheels at the rear of the vehicle. The front differential or front axle module 30 distributes torque between the left hand front side shaft 32 and the right hand front side shaft 34. In an all wheel drive vehicle, power is delivered to both the rear axle module 22 and the front differential 30, the front axle 15 is a primarily driven axle, while the rear axle 14 only receives power when needed. One embodiment of the present invention is an all wheel drive vehicle wherein torque is distributed to each wheel of the secondary axle in an independent manner depending on which wheels are in a slip condition or in a non slip condition with respect to the road. The axle module 22 of the present invention could be used in either the front or rear axle of an all wheel drive unit or even in both the front and rear axle. One end of the prop shaft 24 includes a pinion gear which is rotatably supported by the axle module housing 40 and provides the necessary power needed to spin the side shafts 26,28 and each wheel.

Figure 2:
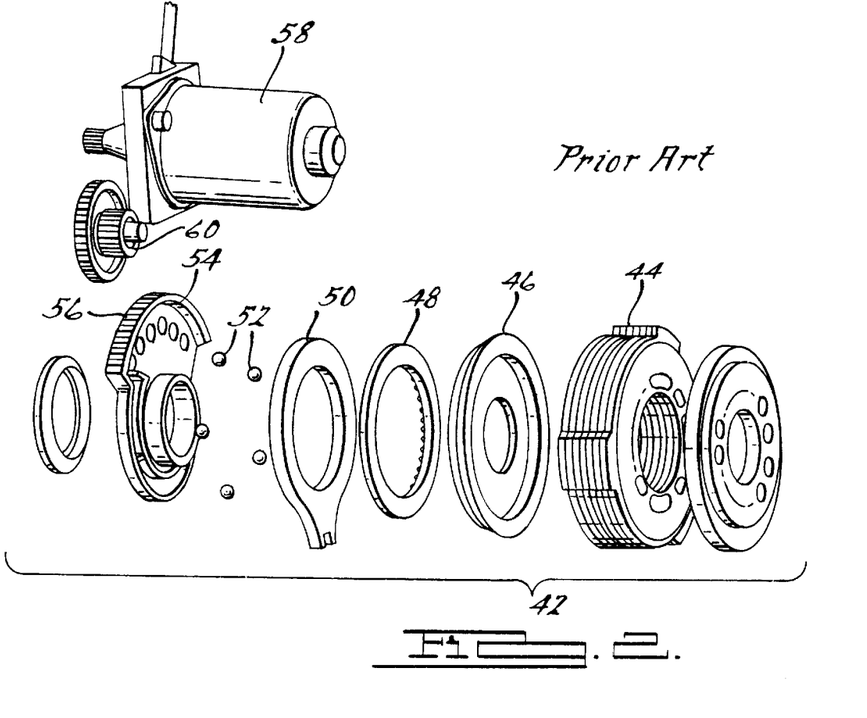
FIG. 2 shows an exploded view of a prior art engagement system.

FIG. 2 shows a prior art engagement system. The prior art engagement system 42 includes a plurality of friction discs 44 arranged next to each other on one end of the system. Engaging the friction discs 44 on one side thereof is a pressure ring 46. The pressure ring 46 is then engaged by a thrust race ring 48 on an end opposite from where the friction discs 44 contact the pressure ring 46. Adjacent to the thrust race 48 is an expander and pressure disc 50 with a plurality of ball ramps on one side thereof rotationally fixed in the housing. Engaged with and located within the ball ramps is a plurality of expander balls 52. Also engaging the expander balls 52 on a side opposite of the expander and pressure disc 50 is an expander disc 54 that also has a plurality of ball ramps on one side thereof. The expander balls 52 are in contact with both the expander disc 54 and pressure disc 50, with the expander balls 52 being placed within the ball ramps of each side surface. The expander disc 54 has a predetermined outer circumference radius surface having a plurality of teeth 56 thereon. The ball ramp engagement mechanism 42 also includes an electric motor 58 that has a reduction gear 60 that engages with the teeth 56 on the outer circumference of the expander disc 54. The electric motor 58 is connected to a controller or computer system. The controller sends the appropriate power to the motor 58 to engage the reduction gear 60 and thus provide a rotational torque to the expander disc 54. Once the expander disc 54 is rotated the expander balls 52 will interact with the ball ramps on the pressure disc 50 and create an axial force do to the rotational torque. This axial force will be transferred to the pressure ring 46 thus transferring the axial force onto the friction discs 44 and compressing the friction discs 44 into one another and providing for a torque transfer between an input torque and a shaft of a vehicle differential or axle.

Figure 3:
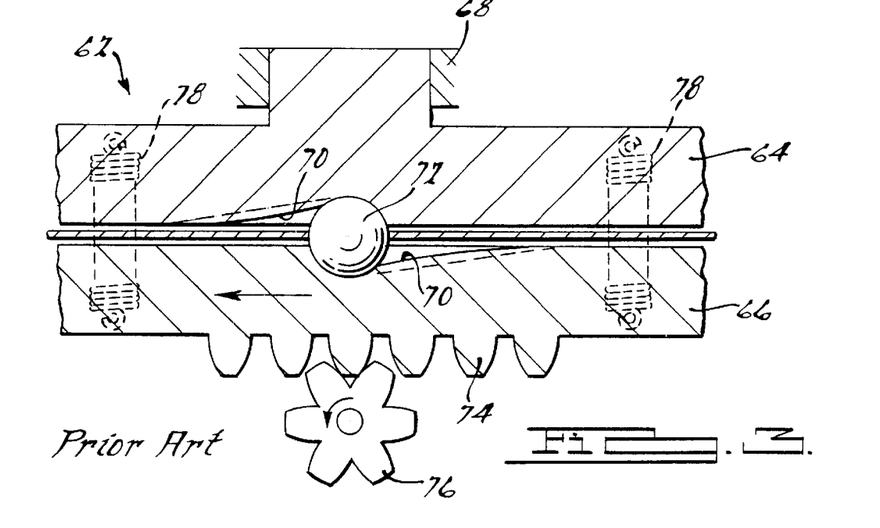
FIG. 3 shows a cross section of a prior art ball ramp engagement mechanism.

FIG. 3 shows another prior art ball ramp mechanism 62 used to convert rotational torque into axial displacement and hence supply an axial force into a friction clutch having a plurality of friction plates or discs. The ball ramp mechanism 62 of FIG. 3 includes a first disc 64 and second disc 66 wherein the first disc 64 is rotationally fixed to a housing 68 or other surface. The first disc 64 and second disc 66 each include a ramp 70 that faces each other on one surface thereof. Each of the ramps 70 has a predetermined angle relative to a radial axis. Located within the ramps 70 of the first 64 and second disc 66 is an expander ball 72. The expander ball 72 will roll along each of the ramps 70 creating an axial force in reaction to the rotational torque being applied to the ball ramp mechanism 62. On an outside surface of the second disc 66 is a plurality of teeth 74 which interact with the gearing or teeth 76 of a motor or reduction gear which is connected to a motor. Therefore, any amount of torque applied in a rotational manner by the gearing 76 will provide a predefined axial movement or separation of the ball ramp disc 64,66 thus allowing for the engagement of a clutch pack and the transfer of torque to various vehicle wheels of an automobile. The prior art ball ramp mechanism 62 also includes a plurality of springs 78 aligned in an axial manner and connected between the first 64 and second disc 66. These springs 78 are used to retract the ball ramp mechanism 62 to its equilibrium position wherein the discs 64,66 are at there smallest width. When the discs 64,66 are at there smallest width there is no engagement of the friction clutch pack and thus no torque transfer through an axle module.

Figure 4:
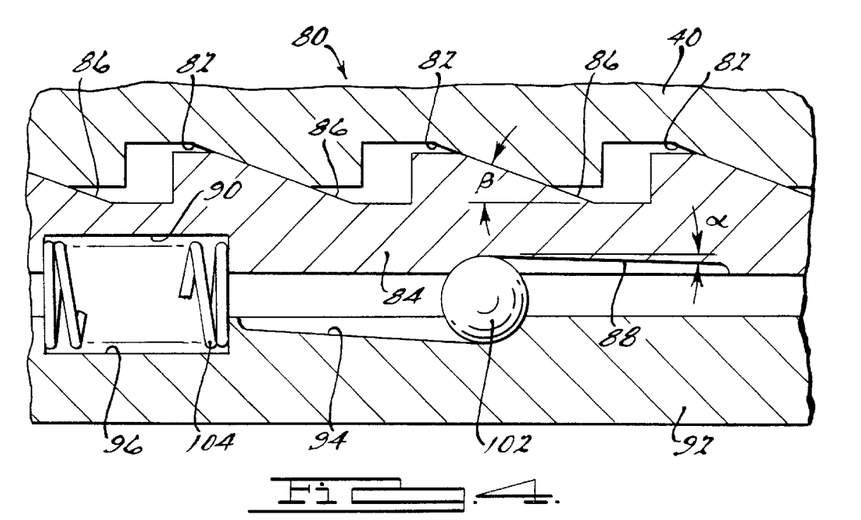
FIG. 4 shows a cross section of a ball ramp engagement mechanism according to the present invention.

FIGS. 4 and 6 show a double stage ramp mechanism 80 according to the present invention. The double stage ramp mechanism 80 can be used in any electrical, mechanical, or combination of such engagement system for operating a friction clutch. Generally, the friction clutches are used in all-wheel drive or 4-wheel drive drivetrain system. These systems send torque to specific axles or wheels depending on the road conditions encountered by the motor vehicle 12. The double stage ramp mechanism 80 includes a housing 40. The housing 40 includes a plurality of ramps 82 on an inside surface thereof. In cross-section the plurality of ramps 82 on the inside surface of the housing 40 have a saw-tooth like appearance. A first ball ramp disc 84 engages the housing 40 on the inner surface of the housing 40. The first ball ramp disc 84 includes a plurality of first ramps 86 on its outer surface thereof. The first ramps 86 of the first ball ramp disc 84 engage with the plurality of ramps 82 on the housing 40. The plurality of first ramps 86 of the first ball ramp disc 84 generally have a high or large ramp angle which gives it a low ratio between rotation and axial travel, thus, providing a quick engagement of the double stage ramp mechanism 80. In one embodiment the high or large angle beta (β) of the first ramp 86, with relation to a radial axis, is greater than or equal to 2°. The high angle beta on the first ramp 86 on the first ball ramp disc 84 mates with and interacts with the ramps 82 on the inside surface of the stationary housing 40. Therefore, the housing 40 has the inverse angle of beta thus allowing for engagement therewith. This also allows for sliding of the plurality of first ramps 86 against the plurality of ramps 82 of the housing 40 which causes axial displacement of the first ball ramp disc 84 from the housing 40.

The first ball ramp disc 84 also includes a plurality of second ramps 88 on the side opposite of the plurality of first ramps 86. The plurality of second ramps 88 uses a small angle alpha (α) with respect to a radial axis to provide a high engagement force at low driving torques. In one embodiment the small angle (α) is less than 2°. The first ball ramp disc 86 also includes a plurality of pockets 90 on an inside surface thereof.

The double stage ramp mechanism 80 includes a second ball ramp disc 92 adjacent to the first ball ramp disc 84. The second ball ramp disc 92 includes a plurality of ramps 94 on a surface facing the first ball ramp disc 84. The second ball ramp disc 92 also includes a plurality of pockets 96 on an inside surface thereof wherein the pockets 96 are adjacent to and across from the pockets 90 located in the first ball ramp disc 84. In one embodiment the ball ramps 94 of the second ball ramp disc 92 have a predetermined angle. The second ball ramp disc 92 includes on an outer circumference thereof a plurality of teeth 98 which engage with an electric motor or a reduction gear 100. The second ball ramp disc 92 has a rotational torque applied to it by the gearing 100 thus rotating the second ball ramp disc 92 in a predetermined direction. A plurality of expander balls 102 are located simultaneously in both the ramps 94 of the second ball ramp disc 92 and second ramps 88 of the first ball ramp disc 84. In one embodiment six expander balls 102 are used for the double stage ramp mechanism 80 however, any number of balls 102 maybe used depending on the need and design requirements of the friction clutch and ramp mechanism. The balls 102 during operation will roll along the second ramp 88 of the first ball ramp disc 84 and the ramp 94 of the second ball ramp disc 92, while they are rolling they will encounter and react to the angle alpha found in the second ramp 88 of the first ball ramp disc 84, thus, creating a force that causes axial movement or axial travel of the second ball ramp disc 92 of the double stage ramp mechanism 80.

A spring element 104 is arranged between the first 84 and second ball ramp disc 92. The spring 104 is located within the pockets 90,96 of both the first ball ramp disc 84 and second ball ramp disc 92, simultaneously. The pockets 90,96 are generally adjacent to one another and across from one another. The spring element 104 defines an axial load and also defines when the system will switch from the angle beta (β) of the first ramp 86 to the angle alpha (α) of the second ramp of the first ball ramp disc 84. Once the friction resistance of the first ramp 86 over comes the spring load ($F_{spring}$) of the spring element 104 the first ramp 86 stops its movement relative to the housing 40 and the second ramp 88 will begin to work. It should be noted that the spring element 104 is arranged along a radial axis of the discs 84,92. Therefore, by using the spring element 104 the double stage ramp mechanism 80 becomes a self adjusting mechanism which provides a low angle engagement ratio at low engagement force and a high ratio as soon as the clutch pack 106 or other device being compressed requires high engagement forces. The double stage engagement mechanism 80 will automatically switch from the high ramp angle (β) of the first ramp 86 of the first ball ramp disc 84 i.e. low axial force but large axial stroke, to the smaller ramp angle (α) of the second ramp 88 of the first ball ramp disc 84 i.e. high engagement force during the different stages needed to ensure clutch pack 106 engagement of the electro mechanical engagement system of a friction clutch. This dual stage, which is automatically activated, will minimize the required angular rotation of the second ball ramp disc 92 and torque necessary to be generated by the electric motor 100 by maximizing the engagement force and the engagement stroke of the double stage mechanism.

The friction force on the first ramp 88 of the first ball ramp disc 84 is a function of the angle beta and the axial force created by rotation of the first ball ramp disc 84 with respect to the housing 40. Hence, the relationship of angle beta and the spring load ($F_{spring}$) of the spring element 104 will define the transition from the two working stages of the two stage ramp mechanism 80. The transition from stage one to stage two is therefore axial load dependant and not axial travel dependant. This makes the system independent from the build tolerances and wear conditions found in the prior art ball ramp mechanisms and clutch packs. Having the high angle beta (β) at the first ramp 88 of the first ball ramp disc 84 will provide for a large displacement at a low force. The high engagement force is than provided by a low angle alpha (α) of the second ramp 88 of the first ball ramp disc 84 which gives a maximum engagement force with a minimum driving torque. This will allow for a smaller motor to be used in the engagement system thus reducing weight and complexity of the system. It should be noted that the first ramp 88 of the first ball ramp disc 84 may also be designed with an angle beta directly in to the stationary housing 40, which will provide the necessary rotational fixation of the first ball ramp disc 84 necessary for the ball ramp mechanism 80 to work properly. It should also be noted that to provide damping for the back drive impact of the discs 84,92, the surfaces between the first ball ramp disc 84 and the stationary housing 40 may be designed so that they are pockets filled with oil thus providing a liquid damping effect when the dual stage ramp mechanism 80 is returned to its equilibrium or smallest width position. It should also be noted that the drive motor 100 might also be actuated in a backward direction to allow for a fully disengaged ball ramp mechanism 80 thus leading to use as a part time, on demand torque delivery system.

Figure 5:
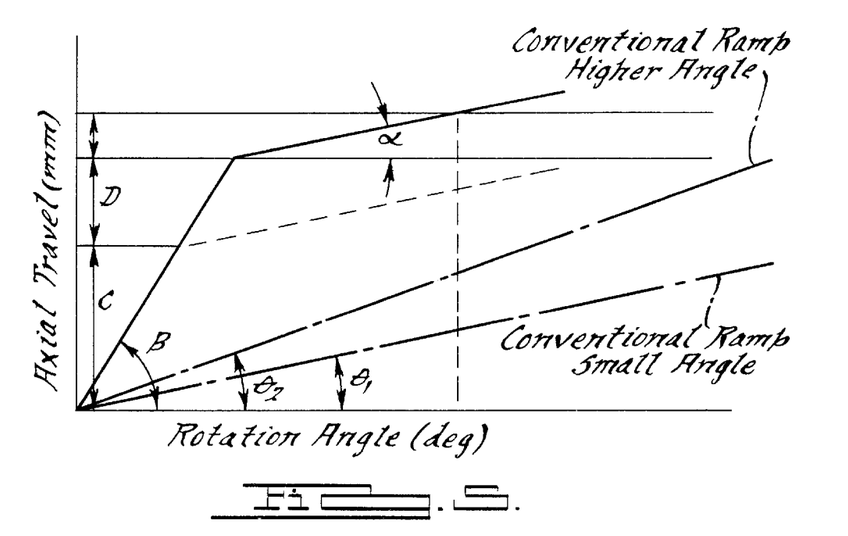
FIG. 5 shows a graph plotting the rotation angle vs. the axial travel.

FIG. 5 shows a graph comparing the rotation angle in degrees vs. axial travel in millimeters. The graph shows the prior art conventional ramps that use a small angle ($\theta_1$), represented by the lower line, need a greater degree of rotation, in terms of rotation angle, to provide a small amount of axial travel. In other prior art ball ramp systems which have a larger angle ($\theta_2$) of the ramp, the same amount of rotation angle as used for ($\theta_1$) increases the axial travel of the ball ramp mechanism. The line representing the ball ramp mechanism according to the current invention includes the initial angle beta (β) which shows that a small rotation angle is used to create an initial large axial movement of the dual stage ramp mechanism 80. After this initial large axial travel the second ramp 88, having the smaller angle (α), is engaged thus providing for smaller axial movements with each increase in the degree of rotation of the device. This will allow for more precise control of the clutch pack engagement and hence more exact control in the torque delivery to the wheels of the automotive vehicle. The initial high axial movement with low rotational angle overcomes the inherent problems in prior art ball ramp mechanism by negating the effect of clutch pack clearance (C) and build tolerances (D) within the drivetrain systems. Negating these factors allows for the second ramp angle (α) to more accurately deliver the torque necessary through the clutch pack 106 leading to more precise drivetrain control and operation.

FIG. 6 shows an axle module 22 according to the present invention. The axle module 22 includes a housing 40. A differential carrier 108 or other type of carrier is rotatably supported within the housing 40. A differential gear set 110 is rotatably supported within the differential carrier 108. At least one clutch pack 106 is arranged within the differential carrier 108 and contacts the differential gear set 110 on one side thereof and a thrust ring 112 on an opposite side thereof. The double stage ball ramp mechanism 80 is arranged between the housing 40 and the differential carrier 108. The housing 40 has a plurality of ramps 82 on an inside surface thereof. A first ramp disc 84 is engaged with the housing 40 at the ramp 82. The first ball ramp disc 84 has a plurality of first ramps 86 on its outer surface which engage with the ramps 82 of the housing 40. Directly adjacent to the first ball ramp disc 84 is a second ball ramp disc 92. The second ball ramp disc 92 has a thrust bearing 114 engaging an inner surface thereof. A thrust disc 116 engages the thrust bearing 114 on a side opposite of the second ball ramp disc 92. A pin or rod 118 engages the thrust disc 116 on an opposite side thereof. The pin or rod 118 is arranged within an orifice 120 through the differential carrier 108 and engages the pressure ring 112 which contacts the clutch pack 106 within the differential carrier 108. The differential carrier 108 generally acts as an open differential and provides an equal split of torque to each side shaft of either a front or rear axle.

In operation the dual stage ball ramp mechanism 80 activates when a slip condition occurs on the primary driven axle of the vehicle. The motor sends a rotational torque to the second ball ramp disc 92. The second ball ramp disc 92 is rotated in a predetermined direction and at an initial low torque which will engage the first stage of the dual stage ball ramp mechanism 80. The first stage includes the first ball ramp disc 84 rotating with relation to the housing 40. This occurs because the initial rotational torque is low and cannot overcome the predetermined spring load ($F_{spring}$) of spring element 104. Therefore, the first ball ramp disc 84 will rotate with relation to the housing 40 until the friction force between the first ramp 86 and the ramps 82 of the housing 40 overcomes the spring load of the spring element 104 at which time the first ramp 86 will stop rotating with relation to the housing 40. Once the first ball ramp disc 84 stops rotating with relation to the housing 40 the second stage is transitioned to and the second ball ramp disc 92 will start rotating with respect to the first ball ramp disc 84 which is now stationary. This rotation of the second ball ramp disc 92 with relation to the first ball ramp disc 84 occurs between the second ramp 88 of the first ball ramp disc 84 and the ramp 94 of the second ball ramp disc 92. With the small angle (α) designed into each of these ramps 88 the expander balls 102 will roll along the ramps 88,94 thus separating the ball ramp discs 84,92 from each other in an axial direction. This axial force will be transferred to the thrust ring 116 which will transfer it to the pin 118 then on to the pressure plate 112. The axial force then compresses the clutch pack friction plates 106 into one another and provide for a torque transfer of the input torque of the differential carrier 108 to the output at the side shafts 26,28 of an automotive vehicle. When the slip event has seized the electric motor 100 will be either run in a reverse direction thus closing the two stage ball ramp mechanism 80 to its smallest width. It should also be noted that the actuating drive motor can be activated in a backwards motion to fully disengage the system however any other type of mechanical means such as the spring elements 104 located therein may also provide such return. It should be noted that the above example has been described only for a differential gear set having an open differential but that any other type of twin electronic mechanisms that use any ball ramp mechanisms may also be used. Furthermore, other types of open differentials may also benefit from the invention such as planetary type differential, or any other known axle modules, may also use the dual stage ball ramp mechanism 80 to create an engagement system for a friction clutch in a drivetrain system.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention maybe practiced otherwise then as specifically described.

What is claimed is:

1. An engagement mechanism for use in a housing, said engagement mechanism including:
   a first ramp disc having a first ramp on a side engaging the housing, said first ramp disc having a second ramp on a side opposite of said first ramp; and
   a second ramp disc adjacent to said first ramp disc, said second ramp disc having a first ramp on one side, said first ramp of said second ramp disc facing said second ramp of said first disc.

2. The engagement mechanism of claim 1 wherein balls are arranged between said first ramp disc and said second ramp disc.

3. The engagement mechanism of claim 1 wherein the second ramp disc is rotatably driven.

4. The engagement mechanism of claim 2 further including a spring between said first ramp disc and second ramp disc.

5. The engagement mechanism of claim 4 wherein said first ramp of said first ramp disc having a high angle to provide a low ratio between a rotation engagement and an axial movement.

6. The engagement mechanism of claim 5 wherein said second ramp of said first ramp disc and said first ramp of said second ramp disc having a small angle.

7. The engagement mechanism of claim 6 wherein said spring having a predetermined load, said load defines an axial load wherein the mechanism switches from said first ramp of said first ramp disc to said second ramp of said first ramp disc.

8. The engagement mechanism of claim 1 wherein a fluid is filled between said first ramp disc and the housing.

9. An engagement mechanism for use in a vehicle, said engagement mechanism including:
   a housing;
   a first ball ramp disc engaging said housing on a first side;

a second ball ramp disc adjacent to the first ball ramp disc on a second side opposite of said first side;

a spring arranged between said first ball ramp disc and said second ball ramp disc;

and wherein said first ball ramp disc has a plurality of first ramps on said side engaging the housing, said first ball ramp disc has a plurality of second ramps on said second side.

10. The engagement mechanism of claim 9 wherein said second ball ramp disc has a plurality of ramps on said second side.

11. The engagement mechanism of claim 10 wherein said first ball ramp disc has at least one pocket on said second side, said second ball ramp disc having at least one pocket on said side engaging said first ball ramp disc.

12. The engagement mechanism of claim 11 wherein said spring is arranged within said pockets of said first and second ball ramp disc.

13. The engagement mechanism of claim 11 further including a plurality of balls contacting one of said plurality of second ramps of said first ball ramp disc and contacting one of said plurality of ramps of said second ball ramp disc.

14. The engagement mechanism of claim 9 wherein said first ramps of said first ball ramps discs has a large angle with respect to a radial axis.

15. The engagement mechanism of claim 14 wherein said large angle is greater than 2°.

16. The engagement mechanism of claim 14 wherein said second ramp of said first ball ramp discs has a small angle with respect to a radial axis.

17. The engagement mechanism of claim 16 wherein said small angle is less than 2°.

18. The engagement mechanism of claim 9 wherein said housing having a plurality of ramps that interact with said first ramp of said first ball ramp disc.

19. An axle module for use on a vehicle, said axle module including;

a housing;

a carrier rotatably supported within said housing;

at least one clutch pack arranged within said carrier;

a first ball ramp disc engaging said housing on a first side thereof, said first ball ramp disc having a first ramp on said side engaging said housing and a second ramp on a side opposite of said first side;

a second ball ramp disc adjacent to said first ball ramp disc on said side having said second ramp;

a ball arranged between said first ball ramp disc and said second ball ramp disc; and a spring contacting said first ball ramp disc and said second ball ramp disc.

* * * * *

UNITED STATES PATENT AND TRADEMARK OFFICE
CERTIFICATE OF CORRECTION

PATENT NO. : 6,571,928 B1  
DATED : June 3, 2003  
INVENTOR(S) : Theodor Gassmann

It is certified that error appears in the above-identified patent and that said Letters Patent is hereby corrected as shown below:

<u>Column 4,</u>  
Lines 54 and 55, delete "there" and insert -- their --

<u>Column 5,</u>  
Line 49, delete "maybe" and insert -- may be --  
Line 67, delete "over comes" and insert -- overcomes --

Signed and Sealed this

Second Day of September, 2003

JAMES E. ROGAN  
*Director of the United States Patent and Trademark Office*